UNITED STATES PATENT OFFICE.

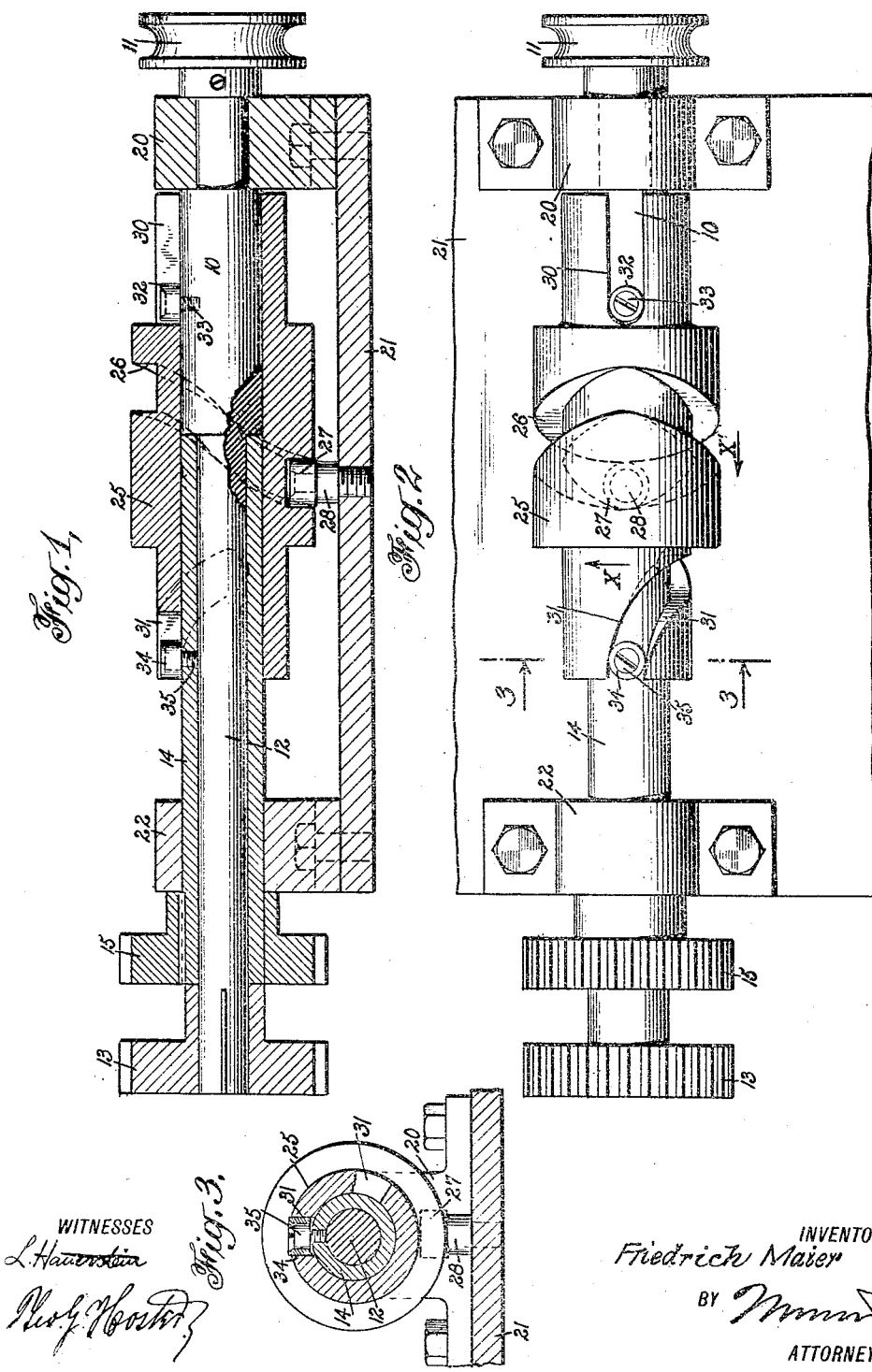

FRIEDRICH MAIER, OF ELIZABETH, NEW JERSEY.

MECHANICAL MOVEMENT.

1,284,733.   Specification of Letters Patent.   Patented Nov. 12, 1918.

Application filed October 17, 1917. Serial No. 197,080.

*To all whom it may concern:*

Be it known that I, FRIEDRICH MAIER, a citizen of the United States, and a resident of Elizabeth, in the county of Union and State of New Jersey, have invented a new and Improved Mechanical Movement, of which the following is a full, clear, and exact description.

The object of the invention is to provide a new and improved mechanical movement arranged to convert continuous rotary motion into intermittent rotary motion in a very simple and efficient manner, thus rendering the mechanical movement exceedingly serviceable in sewing machines, movany picture machines and other machines and devices.

In order to accomplish the desired result, use is made of a continually rotating driving shaft, an intermittently driven shaft, a transmission member, means imparting a continuous reciprocating sliding motion to the said transmission member, means for continually rotating the said transmission member from the said driving shaft, and means for intermittently transmitting the rotary motion of the said transmission member to the said driven shaft.

A practical embodiment of the invention is represented in the accompanying drawings forming a part of this specification, in which similar characters of reference indicate corresponding parts in all the views.

Figure 1 is a sectional side elevation of the mechanical movement with a portion of the driving shaft broken out.

Fig. 2 is a plan view of the same; and

Fig. 3 is a cross section of the same on the line 3—3 of Fig. 2

The driving shaft 10 is provided at one end with a pulley 11 connected with other machinery for imparting a continuous rotary motion to the shaft 10. The shaft 10 is provided with a reduced portion 12 provided at its outer end with a gear wheel 13 for transmitting the rotary motion of the driving shaft to other machinery if it is desired to do so. The intermittently driven shaft 14 is made hollow and is mounted to rotate intermittently on the reduced portion 12 of the driving shaft 10, and the driven shaft 14 is provided at its outer end with a gear wheel 15 for transmitting the intermittent rotary motion of the shaft 14 to other machinery or devices. As shown in the drawings, the driving shaft 10 is journaled in a bearing 20 attached to a base plate 21, and the driven shaft 14 is journaled in a bearing 22 likewise attached to the base plate 21.

On the adjacent portions of the driving shaft 10 and the driven shaft 14 is mounted to slide a sleeve cam 25 provided in its peripheral face with an annular cam groove 26 engaged by friction roller 27 journaled on a pin 28 attached to the base plate 21. The cam 25 is provided at one end with a lengthwise extending straight slot 30 and at the other end the cam is provided with an angular slot 31. The straight slot 30 is engaged by a friction roller 32 held on a stud 33 attached to the driving shaft 10 so that when the latter is rotated then a rotary motion is given by the friction roller 32 to the cam 25. The angular slot 31 is engaged by a friction roller 34 held on a stud 35 attached to the driven shaft 14.

On rotating the shaft 10 its motion is transmitted by the friction roller 32 to the cam 25 which by its cam groove 26 and the friction roller 27 held on the fixed stud 28 is caused to reciprocate in a lengthwise direction, that is, the cam 25 makes a complete movement from the right to the left and back from the left to the right during each revolution of the driving shaft 10. The combined rotary and sliding movement of the cam 25 produces an intermittent rotary motion of the driven shaft 14 owing to the angular slot 31 engaging the friction roller 34 held on the stud 35 secured to the driven shaft 14. When the several parts are in the position shown in Figs. 1 and 2 and the driving shaft 10 is rotated in the direction of the arrow $x$ then a like rotary motion is given to the cam 25 whereby the latter is caused to travel from the right to the left in the direction of the arrow $x'$ during a one-half revolution of the shaft 10. The outer end of the slot 31 is in engagement with a friction roller 34 and as the slot 31 is curved in the opposite direction in which the cam 25 is rotating it is evident that the shaft 14 remains at a standstill provided the pitch of the slot 31 corresponds to the pitch of the groove 26. When the cam 25 reaches the end of its travel in the direction of the arrow $x'$ then the friction roller 34 is at the inner end of the slot 31. When the cam 25 on further rotation of the driving shaft 10 travels in the inverse direction of the arrow $x'$ then the driven shaft 14 is rotated at an accelerated rate of speed owing to the combined rotary movement and the sliding movement of the cam 25 exerted on the friction roller 34. When the cam 25 reaches the end of its stroke then the shaft 14 has made a complete revolution the same as the driving shaft 10. By varying the pitch of the slot 31 relative to that of the cam groove 26 a variation in the movement of the intermittently rotating driven shaft 14 can be obtained to suit existing conditions. It is understood that the pitch of the angular slot 31 is preferably the same as that of the groove 26 so that the driven shaft 14 stands still during the movement of the cam 25 from the left to the right, and during the movement of the cam 25 from the right to the left the driven shaft 14 is rotated twice as fast as the driving shaft 10, and hence the driven shaft 14 makes one revolution for every revolution of the driving shaft 10. The slot 31 may, however, be shaped so that only one or more portions thereof are of the same pitch as that of the groove 26 and the remaining portion or portions of more or less pitch so that the driven shaft 14 remains at a standstill during the time the same moves from the left to the right and the friction roller 34 travels in the portion or portions of the slot 31 which are of the same pitch as that of the groove 26.

The mechanical movement shown and described is very simple and composed of comparatively few parts, not liable to get easily out of order or liable to unduly bind one on the other so that an exceedingly smooth intermittent rotary motion is transmitted to the shaft 14 from the driving shaft 10.

The annular groove 26 may have one or more convolutions to correspondingly change the ratio of the reciprocations.

Having thus described my invention, I claim as new and desire to secure by Letters Patent:—

1. A mechanical movement, comprising a continuously rotating driving shaft, an intermittently driven shaft, the axis of which coincides with the axis of the said driving shaft, a transmission member having an annular slot, means imparting a continuous reciprocating sliding motion to the said transmission member, means for continuously rotating the said transmission member from the said driving shaft, and means on the said driven shaft engaging the said angular slot, for intermittently transmitting the rotary motion of the said transmission member to the said driven shaft.

2. A mechanical movement, comprising a driving shaft having a continuous rotary motion, an intermittently driven shaft, a cam having a reciprocating motion in the direction of its axis, the cam having a straight slot and an angular slot, and members, one held on the said driving shaft and engaging the said straight slot and the other held on the said intermittently driven shaft and engaging the said angular slot.

3. A mechanical movement, comprising a driving shaft having a continuous rotary motion, an intermittently driven shaft, the axis of which coincides with the axis of the said driving shaft, a sleeve cam having an annular cam groove, a straight lengthwise extending slot and an angular slot, a fixed member engaging the said annular cam groove to impart a lengthwise reciprocating sliding movement to the said cam on the said shafts, and fixed members, of which one is secured on the said driving shaft and engages the said straight slot and the other member is attached to the said driven shaft and engages the said angular slot.

4. A mechanical movement, comprising a continuously rotating driving shaft having a reduced portion, an intermittently rotating driven shaft made hollow and through which extends the reduced portion of the said driving shaft, a sleeve cam mounted to slide lengthwise on the adjacent portions of the said driving shaft and the said driven shaft, the said cam having an annular cam groove, a straight slot and an angular slot, a fixed member engaging the said cam groove, a fixed member on the said driving shaft and engaging the said straight slot, and a fixed member on the said driven shaft and engaging the said angular slot.

FRIEDRICH MAIER.

Copies of this patent may be obtained for five cents each, by addressing the "Commissioner of Patents, Washington, D. C."